United States Patent
Choi

(10) Patent No.: US 10,937,392 B2
(45) Date of Patent: Mar. 2, 2021

(54) METHOD OF PROVIDING NOTIFICATION AND ELECTRONIC DEVICE FOR IMPLEMENTING SAME

(71) Applicant: Samsung Electronics Co., Ltd., Suwon-si (KR)

(72) Inventor: Seungmin Choi, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/861,462

(22) Filed: Apr. 29, 2020

(65) Prior Publication Data
US 2020/0258475 A1    Aug. 13, 2020

Related U.S. Application Data

(63) Continuation of application No. 15/007,929, filed on Jan. 27, 2016, now abandoned.

(30) Foreign Application Priority Data

Feb. 3, 2015    (KR) .................. 10-2015-0016680

(51) Int. Cl.
*G09G 5/14*        (2006.01)
*G06F 3/0346*    (2013.01)
(Continued)

(52) U.S. Cl.
CPC ............... *G09G 5/14* (2013.01); *G06F 1/165* (2013.01); *G06F 1/1626* (2013.01); *G06F 1/1652* (2013.01); *G06F 1/1694* (2013.01); *G06F 3/017* (2013.01); *G06F 3/0346* (2013.01); *G06F 3/04886* (2013.01); *G06F 3/1423* (2013.01); *H04M 1/0268* (2013.01); *G09G 2340/0464* (2013.01); *G09G 2360/145* (2013.01);
(Continued)

(58) Field of Classification Search
None
See application file for complete search history.

(56) References Cited

U.S. PATENT DOCUMENTS 6,131,118 A    10/2000    Stupek, Jr. et al.
7,499,731 B2    3/2009    Engstrom et al.
(Continued)

FOREIGN PATENT DOCUMENTS

CN    103299262 A    9/2013
CN    104135555 A    11/2014
(Continued)

OTHER PUBLICATIONS

Toshiyo Tamura et al: Wearable Photoplethysmographic Sensors—Past and Present, Electonics, vol. 3, No. 2, Apr. 23, 2014 pp. 282-302, XP055181931.
(Continued)

*Primary Examiner* — Christopher J Kohlman
(74) *Attorney, Agent, or Firm* — Jefferson IP Law, LLP

(57) ABSTRACT

A method of providing a notification and an electronic device supporting the same are provided. The method includes when an event is received, identifying a state of an electronic device and determining a notification type of the received event and when the notification type is a first type, outputting a notification of the received event in a sub display area of the electronic device.

20 Claims, 17 Drawing Sheets

(51) Int. Cl.
*G06F 3/01* (2006.01)
*G06F 3/14* (2006.01)
*G06F 3/0488* (2013.01)
*H04M 1/02* (2006.01)
*G06F 1/16* (2006.01)
*H04M 1/725* (2021.01)
*H04M 1/23* (2006.01)

(52) U.S. Cl.
CPC ........ *H04M 1/236* (2013.01); *H04M 1/72552* (2013.01); *H04M 2250/12* (2013.01)

(56) References Cited

U.S. PATENT DOCUMENTS

| | | |
|---|---|---|
| 2002/0081005 A1 | 6/2002 | Black |
| 2006/0084394 A1 | 4/2006 | Engstrom et al. |
| 2011/0151935 A1 | 6/2011 | Oksman et al. |
| 2011/0219080 A1 | 9/2011 | McWithey et al. |
| 2011/0237306 A1 | 9/2011 | Kamii |
| 2013/0169545 A1 | 7/2013 | Eaton et al. |
| 2013/0178248 A1* | 7/2013 | Kim ................ H04W 68/02 455/566 |
| 2013/0234836 A1 | 9/2013 | Davis |
| 2013/0237255 A1 | 9/2013 | Shinada |
| 2014/0028546 A1 | 1/2014 | Jeon et al. |
| 2014/0132481 A1 | 5/2014 | Bell et al. |
| 2014/0135594 A1* | 5/2014 | Yuen ................ A61B 5/1118 600/301 |
| 2014/0300533 A1* | 10/2014 | Cho ................ G06F 1/1647 345/156 |
| 2014/0335912 A1* | 11/2014 | Chi ................ H04M 1/0202 455/556.1 |
| 2015/0012850 A1 | 1/2015 | Wang et al. |
| 2015/0031417 A1 | 1/2015 | Lee et al. |
| 2015/0062181 A1* | 3/2015 | Lee ................ G06F 1/1694 345/659 |
| 2015/0169071 A1 | 6/2015 | Jitkoff |
| 2015/0185947 A1 | 7/2015 | Tsai et al. |
| 2015/0187153 A1* | 7/2015 | Davis ................ G07C 9/25 340/5.52 |
| 2015/0340351 A1* | 11/2015 | Rossi ................ H01L 25/167 257/82 |
| 2015/0365509 A1* | 12/2015 | Park ................ H04M 1/0268 455/566 |
| 2016/0088140 A1 | 3/2016 | Yan |

FOREIGN PATENT DOCUMENTS

| | | |
|---|---|---|
| CN | 104144253 A | 11/2014 |
| CN | 104160632 A | 11/2014 |
| CN | 104346097 A | 2/2015 |
| CN | 104750408 A | 7/2015 |
| CN | 105103073 A | 11/2015 |
| EP | 2698686 A2 | 2/2014 |
| EP | 2830293 A1 | 4/2014 |
| JP | 3131745 U | 4/2007 |
| KR | 10-2015-0016401 A | 2/2015 |

OTHER PUBLICATIONS

Chinese Office Action dated Mar. 23, 2020, issued in Chinese Application No. 201610064423.9.
Chinese Office Action dated Sep. 30, 2020, issued in Chinese Application No. 201610064423.9.

* cited by examiner

ND OF PROVIDING NOTIFICATION
AND ELECTRONIC DEVICE FOR
IMPLEMENTING SAME

METHOD OF PROVIDING NOTIFICATION AND ELECTRONIC DEVICE FOR IMPLEMENTING SAME

CROSS-REFERENCE TO RELATED APPLICATION(S)

This application is a continuation application of prior application Ser. No. 15/007,929, filed on Jan. 27, 2016, which was based on and claimed priority under 35 U.S.C. § 119(a) of a Korean patent application filed on Feb. 3, 2015, in the Korean Intellectual Property Office and assigned Serial number 10-2015-0016680, the entire disclosure of each of which is hereby incorporated by reference.

TECHNICAL FIELD

The present disclosure relates to a method and an apparatus for providing a notification of a received event through a side surface of a display of an electronic device.

BACKGROUND

An electronic device may transmit/receive an event such as a phone call, a message, and the like to/from other electronic devices. When the electronic device receives an event from other electronic devices, a notification service of informing a user to the reception of the event is provided. The notification service is provided regardless of an off state or an on state of a display of the electronic device. For example, if the display of the electronic device is in the off state when a message is received, the electronic device turns on the display and provides a message reception notification. Alternatively, when the user configures an event in the electronic device to generate a notification at a particular time, the notification for the configured event is provided if the particular time arrives.

The above information is presented as background information only to assist with an understanding of the present disclosure. No determination has been made, and no assertion is made, as to whether any of the above might be applicable as prior art with regard to the present disclosure.

SUMMARY DISCLOSURE

However, when an event is received by an electronic device, which is positioned upside down, even though the electronic device turns on a display to provide a notification, a user cannot recognize the reception of the event since the electronic device is positioned upside down.

Aspects of the present disclosure are to address at least the above-mentioned problems and/or disadvantages and to provide at least the advantages described below. Accordingly, an aspect of the present disclosure is to provide a method and an apparatus for providing a notification of a received event through a side surface of a display of an electronic device.

Another aspect of the present disclosure is to provide a method of providing a notification according to an embodiment of the present disclosure and an electronic device supporting the same may expand a display area up to a side surface as well as a front surface of the display and, when receiving an event in a state where the electronic device is positioned upside down, provide a notification of the event by controlling the side surface of the display to emit light.

Another aspect of the present disclosure is to provide a method of providing a notification according to an embodiment of the present disclosure and an electronic device supporting the same may control the side surface of the display of the electronic device to differently emit light according to a characteristic of the received event or priority information on the received event.

In accordance with an aspect of the present disclosure, a method of providing a notification is provided. The method includes when an event is received, identifying a state of an electronic device and determining a notification type of the received event and when the notification type is a first type, outputting a notification of the received event in a sub display area of the electronic device.

In accordance with another aspect of the present disclosure, an electronic device is provided. The electronic device includes a sensor configured to detect a state of the electronic device, a display configured to output a notification of an event in a main display area or a sub display area according to the state of the electronic device, the display comprising the main display area and the sub display area, and a processor configured to, when an event is received, determine a notification type of the received event according to the state of the electronic device detected through the sensor and, when the notification type is a first type, output a notification of the received event in the sub display area.

A method of providing a notification according to an embodiment of the present disclosure and an electronic device supporting the same can provide, when an event is received in a state where the electronic device is positioned upside down, a notification for informing of the reception of the event by controlling a side surface of a display to emit light. At this time, the light emitted from the side surface of the display is reflected and output onto a surface, so that a user can intuitively recognize the reception of the event.

Further, a method of providing a notification according to an embodiment of the present disclosure and an electronic device supporting the same can control the side surface of the display of the electronic device to differently emit light according to a characteristic of the received event or priority information on the received event. As a result, the user can easily recognize the received event.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
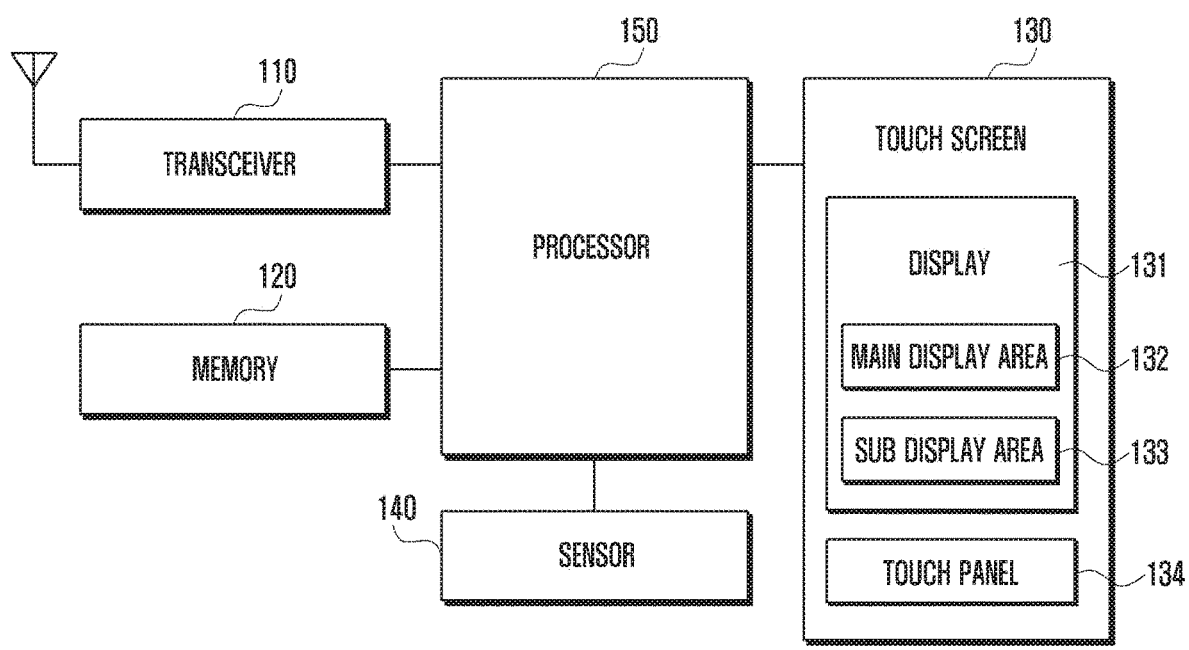
FIG. 1 illustrates a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have," "may have," "include," or "may include" refers to the existence of a corresponding feature (e.g., numeral, function, operation, or constituent element such as component), and does not exclude one or more additional features.

As used herein, the expression "A or B," "at least one of A and/or B," or "one or more of A and/or B" may include any or all possible combinations of items enumerated together. For example, the expression "A or B," "at least one of A and B," or "at least one of A or B" may include (1) at least one A, (2) at least one B, or (3) both at least one A and at least one B.

The terms used herein are merely for the purpose of describing particular embodiments and may not be intended to limit the scope of other embodiments. As used herein, singular forms may include plural forms as well unless the context clearly indicates otherwise. Unless defined otherwise, all terms used herein, including technical terms and scientific terms, may have the same meaning as commonly understood by a person of ordinary skill in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, eve the terms defined herein may not be construed to exclude various embodiments of the present disclosure.

An electronic device according to various embodiments of the present disclosure, for example, may include at least one of a smartphone, a tablet personal computer (PC), a mobile phone, a video phone, an electronic book (e-book) reader, a netbook computer, a personal digital assistant (PDA), a portable multimedia player (PMP), a Moving Picture Experts Group phase 1 or phase 2 (MPEG-1 or MPEG-2) audio layer 3 (MP3) player, a camera, and a wearable device (e.g., an electronic clothes, an electronic bracelet, an electronic accessory, an electronic tattoo, a smart mirror, or a smart watch).

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a configuration of an electronic device according to an embodiment of the present disclosure.

Referring to FIG. 1, the electronic device according to an embodiment of the present disclosure may include a transceiver 110, a memory 120, a touch screen 130, and a sensor 140, and a processor 150.

The transceiver 110 may establish communication between the electronic device and an external electronic device. For example, the transceiver 110 may be connected to a network through wired or wireless communication to communicate with an external electronic device. The wireless communication, for example, may include Wi-Fi, Bluetooth (BT), near field communication (NFC), and the like. The wireless communication may also include at least one of cellular communications (for example, long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM)). The wired communication, for example, may include at least one of a universal serial bus (USB), a high definition multimedia interface (HDMI), recommended standard 232 (RS-232), and a plain old telephone service (POTS).

Particularly, according to an embodiment of the present disclosure, the transceiver 110 may receive an event such as a call, a message, or the like from another electronic device. Further, the transceiver 110 may receive a push service event such as an application update or the like from an external network.

The memory 120 may include a program memory for storing an operation program of the electronic device and a data memory for storing data, such as log information, contents, objects, and the like generated while a program is executed.

Particularly, according to an embodiment of the present disclosure, the memory 120 may store configuration information related to the operation of a main display area 132 and a sub display area 133 included in the display 131 according to a state of the electronic device. For example, when it is determined, as the state of the electronic device, that the electronic device is not positioned upside down under a control of the processor 150, the memory 120 may store configuration information to output a notification of the received event by using the main display area 132. Further, when it is determined, as the state of the electronic device, that the electronic device is positioned upside down under a control of the processor 150, the memory 120 may store configuration information to output a notification of the received event by using the sub display area 133. The memory 120 may map and store a location of a segment of the sub display area 133 to provide the notification according to the received event.

When a user input is detected in the sub display area 133 or the rear surface of the electronic device under a control of the processor 150, the memory 120 may map and store a response feedback to be made according to the received event. For example, the memory 120 may map and store a function of transmitting a message indicating that an immediate reply is not possible, as the response feedback of the message event. Alternatively, when an event is received by a particular originator, the memory 120 may store a message to be transmitted to the particular originator in response to the received event. Further, the memory 120 may map and store a function of executing the application update, as the response feedback of the application update event.

The touch screen 130 may include a display 131 and a touch panel 134 which are integrally implemented. The display 131 may display various screens according to the use of the electronic device under a control of the processor 150. Further, the display 131 may be constituted by a liquid crystal display (LCD), an organic light emitted diode (OLED), an active matrix OLED (AMOLED), a flexible display, a bended display, or a three dimensional (3D) display. In addition, the display 131 may be implemented to be flexible, transparent, or wearable. The touch panel 134 may be a complex touch panel including a hand touch panel detecting a hand gesture and a pen touch panel detecting a pen gesture.

Particularly, according to an embodiment of the present disclosure, the display 131 may include the main display area 132 on the front surface of the electronic device and the sub display area 133 on the side surface of the electronic device.

When an event is received under a control of the processor 150 and it is determined as the state of the electronic device that the electronic device is not positioned upside down, the main display area 132 may output a notification of the received event.

When an event is received under a control of the processor 150 and it is determined as the state of the electronic device that the electronic device is positioned upside down, the sub display area 133 may emit light in response to the received event. The sub display area 133 may be divided into a plurality of segments and a plurality of segments including a combination of individual segments or at least two segments of the plurality of segments may emit light in response to the received event.

The sensor 140 may measure a physical quantity or sense an operation state of an electronic device, so as to convert the measured or sensed information into an electric signal. The sensor 140 may be one or more sensors, and may include, for example, at least one of an acceleration sensor, a gyro sensor, a geomagnetic sensor, an illumination sensor, a proximity sensor, a photo sensor, and a biometric sensor.

Particularly, according to an embodiment of the present disclosure, the acceleration sensor, the gyro sensor, the geomagnetic sensor, and the illumination sensor may detect a state change of the electronic device and transfer a detection signal corresponding to the state change to the processor 150.

According to an embodiment of the present disclosure, the photo sensor may be positioned in the sub display area 133, and the sub display area 133 may include a plurality of pixels. The pixel may consist of a total of three sub pixels including red (R), green (G), and blue (B), and one of the three sub pixels R, G, and B may be replaced with a photo diode. Alternatively, the pixel may consist of a total of four sub pixels including R, G, B, and the photo diode.

While the sub display area 133 emits light in response to the received event, the photo sensor may detect a user input and transfer a signal for the detected user input to the processor 150.

Further, the sensor 140 may detect a state of the electronic device and, when it is determined as the state of the electronic device that the electronic device is positioned upside down under a control of the processor 150, the sensor 140 may detect a color of a bottom surface by using the photo sensor.

According to an embodiment of the present disclosure, the biometric sensor may include a light emitter for generating light to measure photoplethysmography (PPG) and a light receiver for receiving light that varies depending on vasorelaxation and vasoconstriction. According to an embodiment of the present disclosure, the biometric sensor may be a PPG sensor. The PPG sensor may measure PPG according to a light change (for example, light penetration amount) according to vasorelaxation and vasoconstriction of a user's body part (for example, a body part through which the artery passes such as a user's fingertip or the like) by using the light.

According to an embodiment of the present disclosure, while the sub display area 133 emits light in response to the received event, the PPG sensor may detect a user input and transfer a signal for the detected user input to the processor 150. For example, the PPG sensor may detect a change in a blood amount according to a contraction period and a relaxation period of a user's body part. The PPG sensor may transfer a PPG signal according to the change in the blood amount to the processor 150. According to an embodiment of the present disclosure, it is assumed that the PPG sensor is located on the rear surface (for example, an area adjacent to a camera) of the electronic device.

The PPG sensor may include a heart rate monitor (HRM) and a heart rate variability (HRV) sensor. The HRM may measure a heart rate based on the measured PPG. The HRV sensor may analyze HRV according to a detected user's body part and acquire biometric information including autonomic nervous system information on the user's body part based on a result of the analysis. Hereinafter, according to an embodiment of the present disclosure, it is assumed that the biometric sensor corresponds to the HRM.

The processor 150 controls the overall operation of the electronic device and signal flows between internal elements of the electronic device, processes data, and controls power supply from a battery to the elements.

Particularly, according to an embodiment of the present disclosure, when an event is received, the processor 150 may identify a state of the electronic device and determine a notification type of the received event. The processor 150 may detect an illumination value through an illumination sensor and values of x, y, and z axes of the electronic device through an acceleration sensor and a geomagnetic sensor, and determine whether the electronic device is positioned upside down.

When it is determined that the electronic device is positioned upside down, the processor 150 may determine the notification type of the received event as a first notification type. Alternatively, when it is determined that the electronic device is not positioned upside down, the processor 150 may determine the notification type of the received event as a second notification type.

When the notification type is determined as the first notification type, the processor 150 may control the sub display area 133 to emit light in response to the received event. When the sub display area 133 emits light, the processor 150 may configure different notification styles according to a characteristic of the received event. For example, when an event is received, the processor 150 may determine a notification style in which one or more of a pattern to emit light in the sub display area 133, a location (for example, a segment location of the sub display area 133), and a color are combined according to the characteristic of the received event.

The processor 150 may detect a user input by a sensor included in the sub display area 133 while the sub display area 133 emits light. According to an embodiment of the present disclosure, the sensor included in the sub display area 133 may be a photo sensor. The user input may mean detection of proximity of an object (for example, a user's finger or a stylus pen) to the sub display area 133. When the proximity of the object to the sub display area 133 is detected through the photo sensor, the processor 150 may provide a response feedback of the received event in response to the proximity of the object.

Further, the processor 150 may detect a user input by a sensor located on the rear surface of the electronic device while the sub display area 133 emits light. According to an embodiment of the present disclosure, the sensor located on the rear surface of the electronic device may be a biometric sensor. The processor 150 may determine whether a user's body part (for example, a user's finger) is in proximity to or contacts the electronic device through the biometric sensor. For example, the processor 150 may determine whether the user's body part is in proximity to or contacts the biometric sensor based on a PPG signal according to the user's body part received from the biometric sensor. For example, when differences between increases and decreases in light received by the light receiver according to vasodilatation and vasoconstriction are small, the processor 150 may determine it as a non-contact state. When it is determined that the user's body part is in proximity to or contacts the biometric sensor, the processor 150 may provide a response feedback of the received event.

According to an embodiment of the present disclosure, when the notification type is determined as the second notification type, the processor 150 may provide the notification of the received event through the main display area 132.

When the notification type is determined as the first notification type and state switching of the electronic device is detected in a state where the sub display area 133 emits light, the processor 150 may determine the notification type as the second notification type. When the notification type is determined as the second notification type, the processor 150 may switch the area in which the notification is output from the sub display area 133 to the main display area 132 and display the notification in the main display area 132.

Further, the electronic device may optionally further include elements having additional functions, such as a global positioning system (GPS) module for receiving location information, an audio processor including a microphone and a speaker, a camera module for photographing an image or a moving image, a broadcast receiving module for receiving a broadcasting signal, and an input device for supporting inputs based on hard keys, but the detailed description and illustration thereof will be omitted.

Figure 2A:
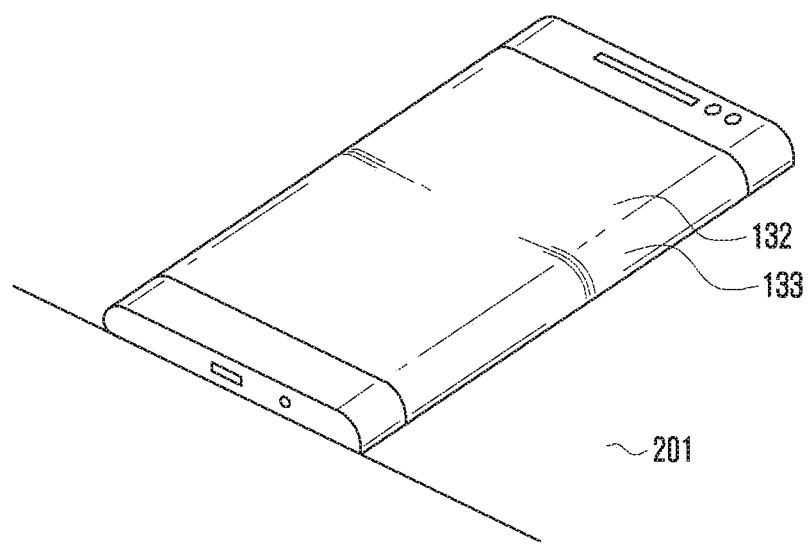
FIGS. 2A and 2B illustrate an electronic device according to various embodiments of the present disclosure.
Figure 2B:
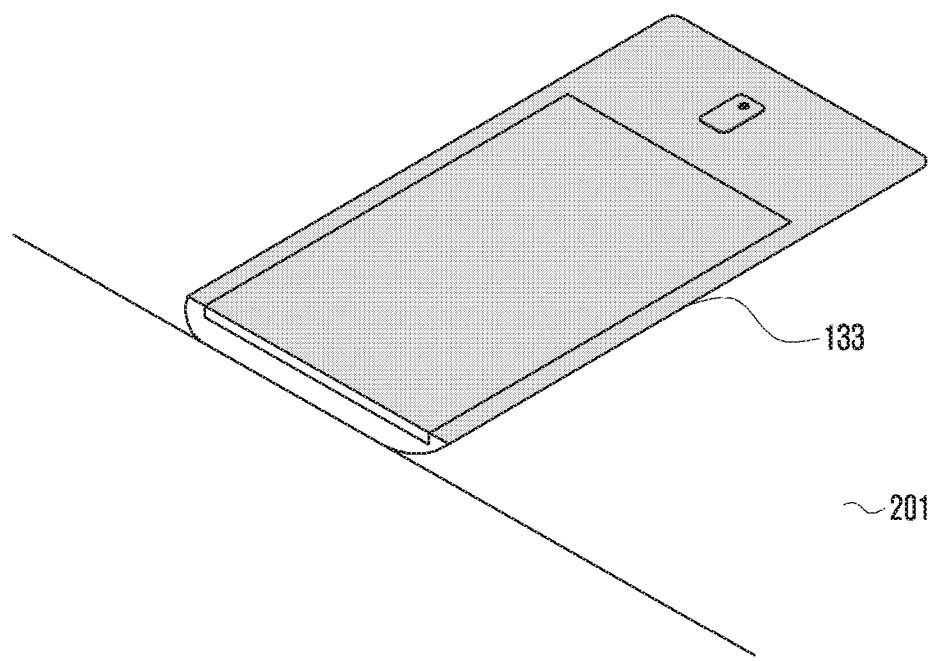

FIGS. 2A and 2B illustrate an electronic device according to various embodiments of the present disclosure.

Referring to FIGS. 2A and 2B, the touch screen 130 of the electronic device may be configured by a flexible display. The flexible display features in being bent, folded, or rolled without damage through a paper thin and flexible substrate. According to an embodiment of the present disclosure, the flexible display may be extended to at least one side (for example, at least one surface of the left side, right side, upper side, and lower side) and coupled to the side of the electronic device while being bent within an operable radius of curvature. Hereinafter, according to an embodiment of the present disclosure, a flat front area based on the front part of the flexible display may be defined as the main display area 132. Further, an area, which is extended from the main display area 132 and formed on the side surface of the front part of the electronic device while being bent on at least one side surface of the electronic device, may be defined as the sub display area 133.

Further, according to an embodiment of the present disclosure, two displays including the main display area 132 and the sub display area 133 may be combined to implement one touch screen 130.

According to an embodiment of the present disclosure, the processor 150 may determine a state of the electronic device by using the sensor 140 and provide a notification of an event through the main display area 132 or the sub display area 133. For example, the processor 150 may determine the state of the electronic device by using an illumination value detected by the illumination sensor and x, y, and z axis values of the electronic device detected by the acceleration sensor and the geomagnetic sensor.

According to an embodiment of the present disclosure, the electronic device may divide the display 131 into the main display area 132 on the front surface and the sub display area 133 on the side surface. As illustrated in FIG. 2A, when it is determined that the electronic device is not positioned upside down, the processor 150 may output the notification in the main display area 132. At this time, the sub display area 133 may be in an off state.

Alternatively, as illustrated in FIG. 2B, when it is determined that the electronic device is positioned upside down, the processor 150 may output the notification of the received event in the sub display area 133. For example, the processor 150 may control the sub display area 133 to emit light in response to the received event. At this time, the main display area 132 may be in an off state. However, the present disclosure is not limited thereto. When the sub display area 133 emits light in response to the received event, the electronic device may further control a partial area of the main display area 132 connected to the sub display area 133 to emit light as well as the sub display area 133.

According to an embodiment of the present disclosure, when the sub display area 133 emits light, the emitted light is reflected onto a surface, so that the user may intuitively recognize the reception of the event.

Further, according to an embodiment of the present disclosure, a user input may be detected through the sub display area 133 or a sensor located on the rear surface of the electronic device. According to an embodiment of the present disclosure, the sub display area 133 may include a photo sensor. The processor 150 may detect proximity of an object (for example, a user's finger) by using the photo sensor. Further, according to an embodiment of the present disclosure, the processor 150 may detect proximity or contact of the object based on PPG of the object (for example, the user's finger) measured through the biometric sensor (for example, the HRM) located on the rear surface of the electronic device.

When the proximity of the object is detected through the photo sensor, the processor 150 may provide a response feedback of the received event. Alternatively, when the proximity or contact of the object is detected through the biometric sensor, the processor 150 may provide a response feedback of the received event. For example, when a message is received, the processor 150 may transmit a message indicating that an immediate reply is not possible to an originator of the received message. The response feedback may include a message set by default and a personalized message set to a particular user. In other words, when the message is received, the processor 150 may transmit the message set by default to the originator of the received message or transmit the personalized message preset to be transmitted to the originator. For example, when the message is received, the processor 150 may parse the message to extract information on the originator (for example, a name and a phone number) of the message. Alternatively, the processor 150 may extract originator information (for example, a name or a nickname) that matches a calling number according to the event by using contact information stored in the electronic device. The processor 150 may insert the extracted originator information to the message set by default and transmit the message. Further, when an application update event is received, the processor 150 may execute the application update.

Figure 3:
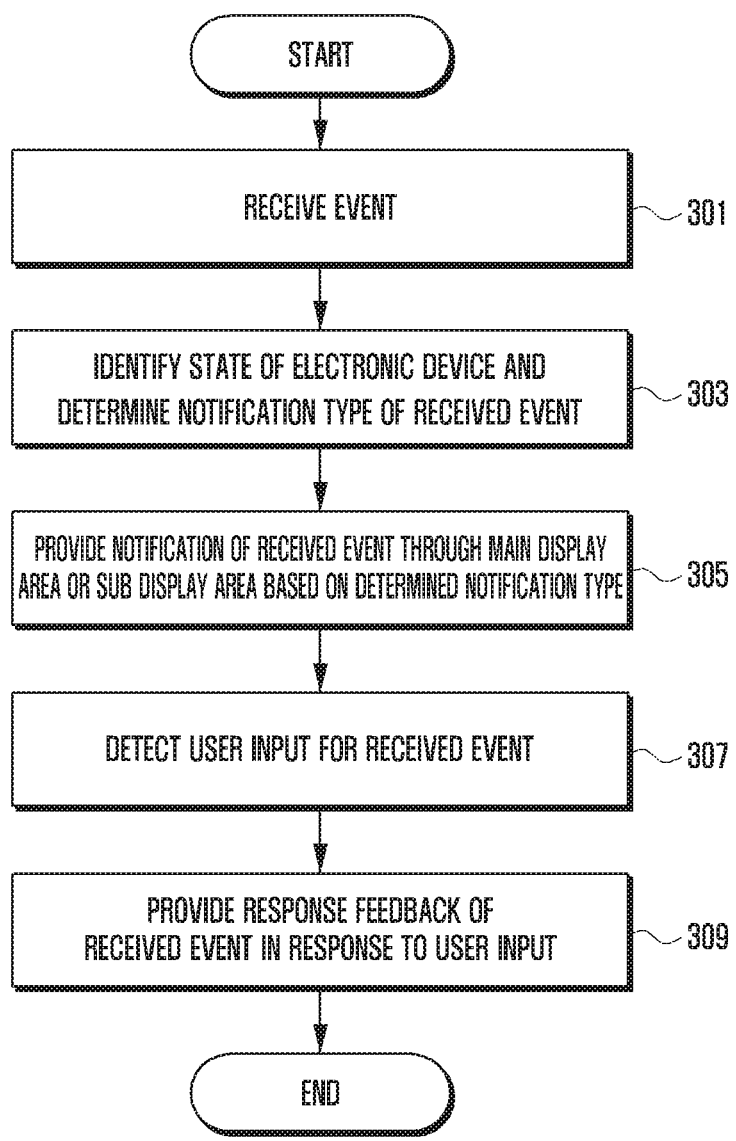
FIG. 3 is a flowchart illustrating a method of providing a notification according to an embodiment of the present disclosure.

FIG. 3 is a flowchart illustrating a notification providing method according to an embodiment of the present disclosure.

Referring to FIG. 3, the processor 150 may receive an event in operation 301. The event may include a call, message, information on a push service, mail, social networking service (SNS) notification, and the like, received from the outside (for example, a base station, another electronic device, a push server, and the like).

When the event is received, the processor 150 may identify a state of the electronic device and determine a notification type of the received event in operation 303.

According to an embodiment of the present disclosure, the notification type of the received event may include a first notification type and a second notification type.

The processor 150 may identify the state of the electronic device through the sensor 140. More specifically, the processor 150 may determine, as the state of the electronic device, whether the electronic device is positioned upside down through the sensor 140. When it is determined that the electronic device is positioned upside down through the sensor 140, the processor 150 may determine the notification type of the received event as the first notification type. Alternatively, when it is determined that the electronic device is not positioned upside down through the sensor 140, the processor 150 may determine the notification type of the received event as the second notification type.

For example, according to an embodiment of the present disclosure, the processor 150 may determine an illumination value by the illumination sensor and determine whether the measured illumination value is within in a preset reference condition (for example, a case where the main display area 132 is covered and the illumination value is equal to or smaller than a predetermined reference value). When the illumination value is within the preset reference condition, the processor 150 may determine a state of the electronic device by an additional operation sensor and display the notification of the received event in the sub display area 133 according to the state. For example, the additional operation sensor may include an acceleration sensor and a geomagnetic sensor, and the processor 150 may detect values of x, y, and z axes of the electronic device through the acceleration sensor and the geomagnetic sensor and determine the state of the electronic device.

The processor 150 may output the notification of the received event in the main display area 132 on the front surface of the display 131 and the sub display area 133 on the side surface of the display 131 based on the determined notification type in operation 305.

According to an embodiment of the present disclosure, when the notification type is determined as the first notification type, the processor 150 may output the notification in the sub display area 133. For example, the processor 150 may control the sub display area 133 to emit light in response to the received event. At this time, the main display area 132 may be in an off state.

When the sub display area 133 emits light, the processor 150 may control the sub display area 133 to differently emit light according to a characteristic of the received event. The processor 150 may control the sub display area 133 to emit light according to a notification style based on a priority set to the event. The notification style may include a pattern to emit light in the sub display area 133, a location (for example, a segment of the sub display area 133), and a color. For example, between a message event, an SNS notification event, and a call event, the processor 150 may set the call event to have a first priority, the message event to have a second priority, and the SNS notification event to have a third priority. When the call event having the first priority is received, the processor 150 may control the sub display area 133 to emit light with a red color. Further, when the message event having the second priority is received, the processor 150 may control the sub display area 133 to emit light with a yellow color. In addition, when the SNS notification event having the third priority is received, the processor 150 may control the sub display area 133 to emit light with a green color.

The processor 150 may control the sub display area 133 to differently emit light according to each person or each group stored in the contacts. In other words, the notification styles of the received event may be different in a case where the call or message is received from a person and a case where the call or message is received from a group.

According to an embodiment of the present disclosure, when the notification type is determined as the second notification type, the processor 150 may provide the notification of the event through the main display area 132. At this time, the sub display area 133 may not emit light. In other words, the sub display area may be in an off state.

According to an embodiment of the present disclosure, when the notification type is determined as the first notification type and thus the notification is output in the sub display area 133, and then the state switching of the electronic device is detected and thus it is determined, as the state of the electronic device, that the electronic device is not positioned upside down, the processor 150 may determine the notification type as the second notification type and switch the area, in which the notification is output, to control the notification, which has been output in the sub display area 133, to be output in the main display area 132.

The processor 150 may detect a user input for the received event in operation 307. According to an embodiment of the present disclosure, when the notification type is the first notification type, the user input may be detected through the sub display area 133 or a sensor located on the rear surface of the electronic device. According to an embodiment of the present disclosure, when the notification type is the first notification type, the processor 150 may detect the user input by a photo sensor included in the sub display area 133. The processor 150 may detect proximity of an object (for example, a user's finger or a stylus pen) to the sub display area 133 through the photo sensor. Alternatively, the processor 150 may determine whether the object is in proximity to or contacts a biometric sensor located on the rear surface of the electronic device. According to an embodiment of the present disclosure, the processor 150 may determine whether the user's finger is in proximity to or contacts the biometric sensor based on PPG measurement of the object, for example, the user's finger through the biometric sensor. When the proximity of the object is detected through the photo sensor, the processor 150 may determine that the user input is detected. Alternatively, when the proximity or contact of the object to the biometric sensor is detected according to the PPG measured through the biometric sensor, the processor 150 may determine that the user input is detected.

When the user input is detected, the processor 150 may provide a response feedback of the received event in operation 309. For example, when the call event is received, the user may be in a state (for example, in a meeting) where the call event cannot be received. The processor 150 may detect a user input for the received call event. In response to the user input, the processor 150 may transmit a response feedback of the call event, for example, a message or a voice including "I cannot receive a call now" to an originator of the call event.

According to an embodiment of the present disclosure, the processor 150 may control to transmit a message set by default regardless of the originator of the received event. Alternatively, when the received event is the message event, the processor 150 may parse the message to extract the originator information. For example, the originator information may include a name and a phone number of the originator. The processor 150 may control to insert "Dear originator information" into the message set by the default based on the extracted originator information and to transmit the message. Alternatively, the processor 150 may control to transmit the personalized message preset to be transmitted to the originator of the received event. Alternatively, when the application update event is received and a user input of the received application update event is detected, the processor 150 may perform an application update function.

According to an embodiment of the present disclosure, when the notification type is the second notification type, the user input may be a response gesture including an action of touching a rejection or answer button in a call event notification displayed in the main display area 132.

FIGS. 4A to 9C described below are diagrams illustrating, when an event is received and the electronic device is positioned upside down, for example, the main display area 132 of the front surface of the display 131 of the electronic device faces downward to contact a surface 201, a method of providing a notification of the received event to the sub display area 133.

Figure 4A:
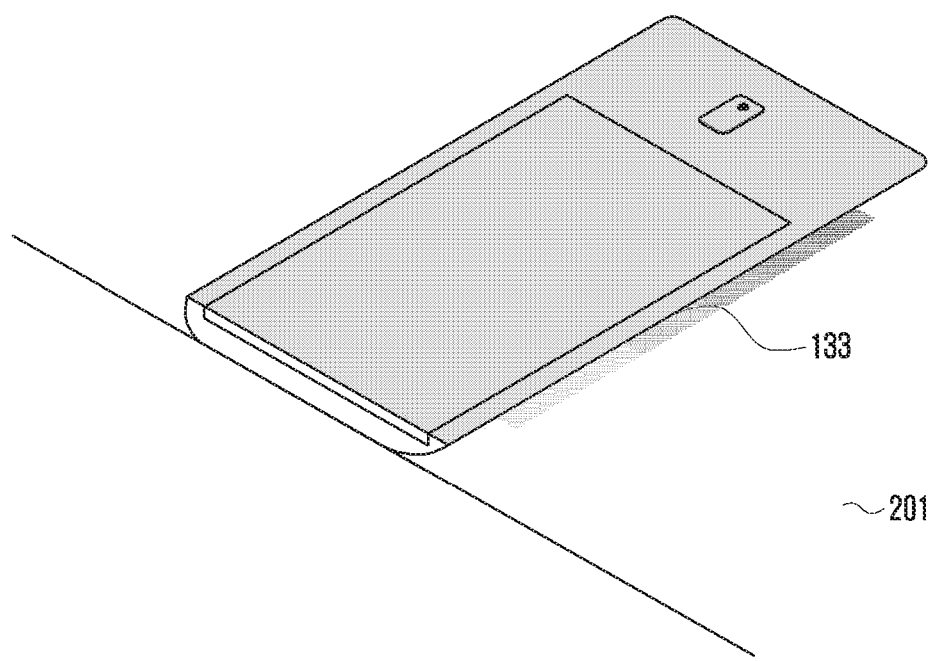
FIGS. 4A and 4B illustrate a method of providing a notification according to various embodiments of the present disclosure.
Figure 4B:
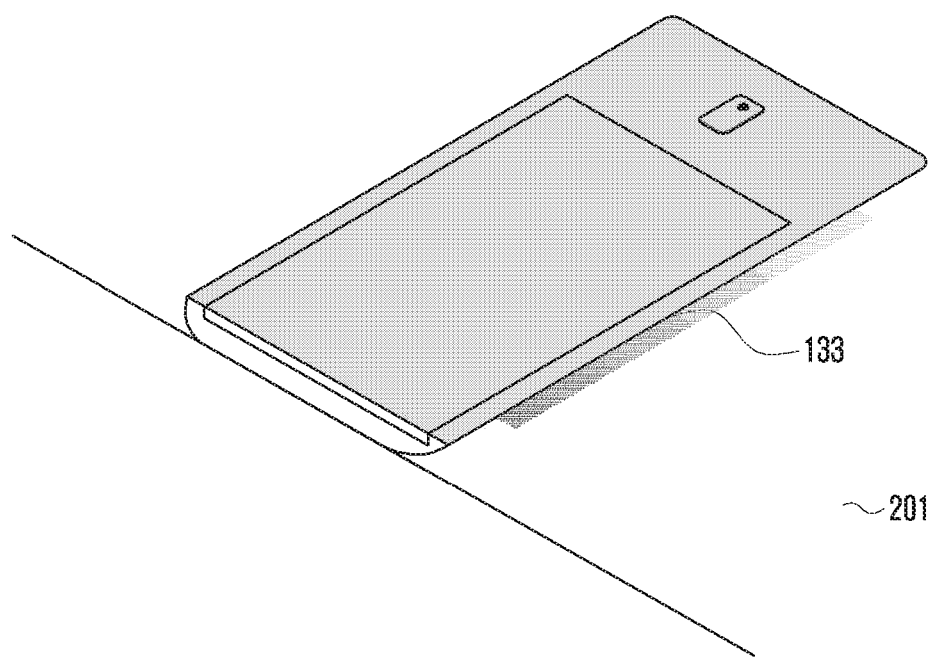

FIGS. 4A and 4B illustrate a method of providing a notification according to various embodiments of the present disclosure.

Referring to FIGS. 4A and 4B, when an event is received, the processor 150 may identify a state of the electronic device through the sensor 140. When it is determined that the electronic device is positioned upside down, the processor 150 may control the sub display area 133 to emit light in response to the received event. For example, as illustrated in FIG. 4A, the processor 150 may control the sub display area 133 to emit light in such a manner that the light moves from the lower part to the upper part in response to the received event. Subsequently, as illustrated in FIG. 4B, the processor 150 may control the sub display area 133 to emit light in such a manner that the light, which has been emitted from the lower part to the upper part in FIG. 4A, moves back from the upper part to the lower part.

In other words, when the event is received, the processor 150 may control the sub display area 133 to emit light in a pattern in which the light moves from the lower to the upper part and then moves back from the upper part to the lower part. Since the light emitted in the pattern of moving from the lower part to the upper part and then moving back from the upper part to the lower part is reflected in the surface 201, the user may intuitively recognize the reception of the event even when the electronic device is positioned upside down.

The pattern to emit light in the sub display area 133 of FIGS. 4A and 4B may be repeatedly made. According to an embodiment of the present disclosure, although it has been described that the light moves from the lower part to the upper part and then moves back from the upper part to the lower part in the light-emitting pattern output in the sub display area 133, the present disclosure is not limited thereto and may be variously implemented. For example, the processor 150 may control the sub display area 133 to emit light in a flickering pattern. Further, the processor 150 may control to emit different color lights in an edge of the sub display area 133 and in an inside of the edge.

Figure 5A:
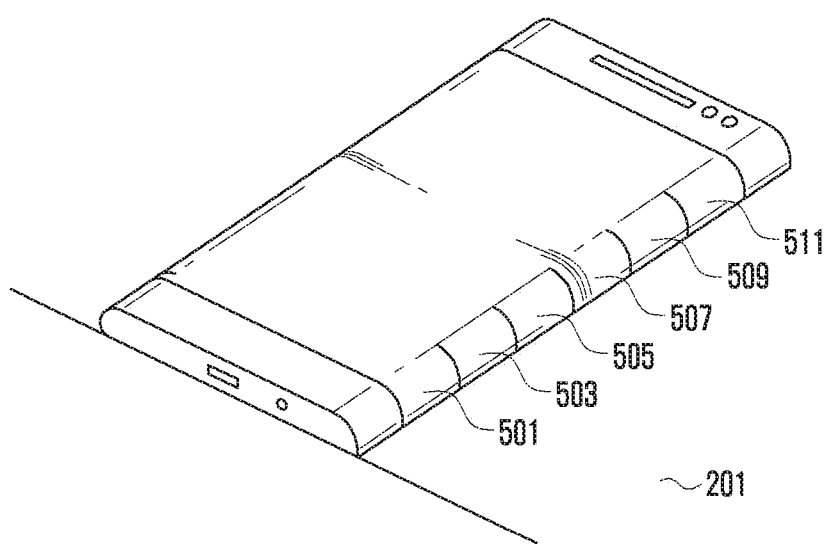
FIGS. 5A to 5C illustrate a method of providing a notification according to various embodiments of the present disclosure.
Figure 5B:
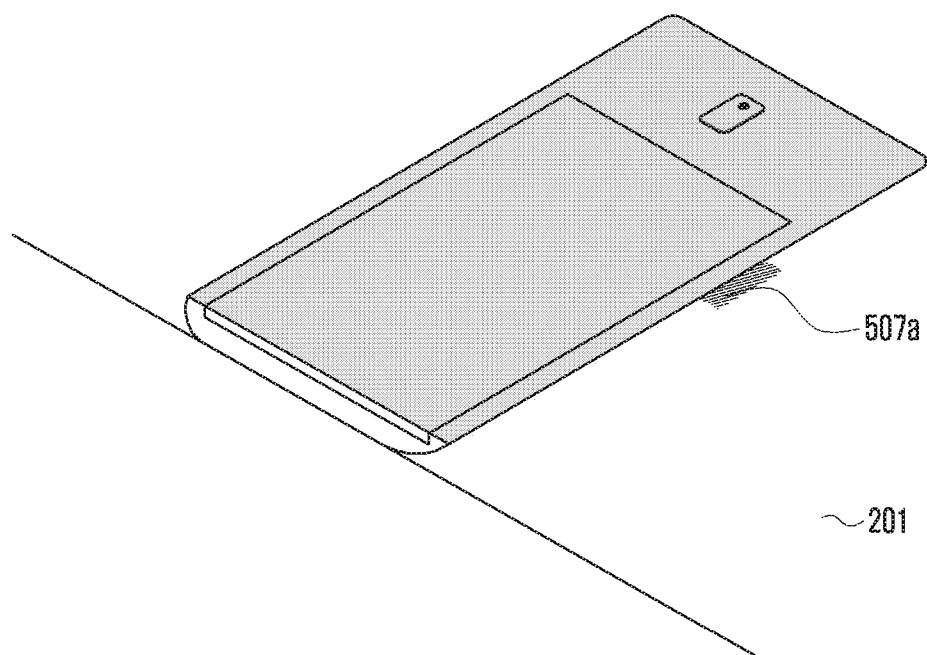
Figure 5C:
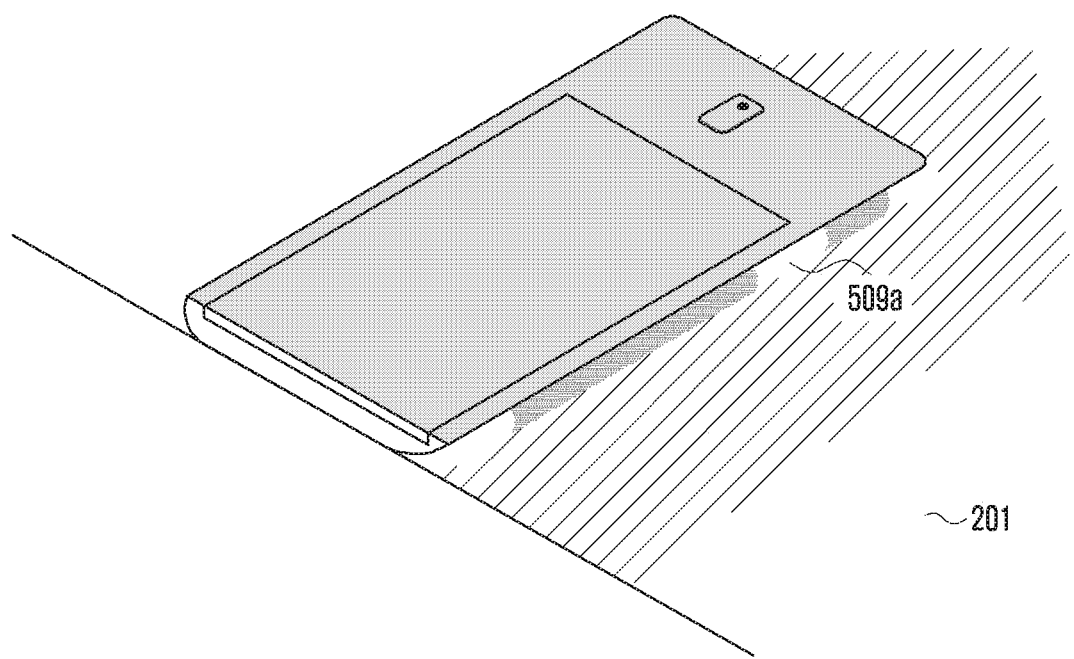

FIGS. 5A to 5C illustrate a method of providing a notification according to various embodiments of the present disclosure.

Referring to FIGS. 5A to 5C, as illustrated in FIG. 5A, the sub display area 133 on the side surface of the display 131 may be divided into a plurality of segments (for example, a first segment 501, a second segment 503, a third segment 505, a fourth segment 507, a fifth segment 509, and a sixth segment 511). The division of the six segments in the sub display area 133 is only an embodiment, and may be variously implemented according to a user setting.

According to an embodiment of the present disclosure, the processor 150 may control an individual segment or a plurality of segment including a combination of at least two segments of the divided segments to emit light in response to the received event.

When the event is received, the processor 150 may identify a segment to provide a notification of the received event among the plurality of segments. The processor 150 may control the identified segment to emit light in response to the received event.

For example, as illustrated in FIG. 5A, the sub display area 133 may be divided into the six segments 501 to 511 and a corresponding individual segment may emit light according to a characteristic of the received event. For example, the processor 150 may set the first segment 501 to emit light when a call is received, set the second segment 503 to emit light when a message is received, set the third segment 505 to emit light when a push service is received, set the fourth segment 507 to emit light when an SMS notification is received, set the fifth segment 509 to emit light when mail is received, and set the sixth segment 511 to emit light when a charging event is received.

Further, according to an embodiment of the present disclosure, the sub display area 133 may be divided into the six segments 501 to 511, and a plurality of segments including a combination of at least two corresponding segments may emit light according to a characteristic of the received event. For example, when the call is received (for example, when the call is received from user A), the processor 150 may set two segments including a combination of the first segment 501 and the second segment 503 to emit light. Further, when the message is received (for example, when the message is received from user B), the processor 150 may set two segments including a combination of the second segment 503 and the fourth segment 507 to emit light.

As illustrated in FIG. 5B, when the event is received, the processor 150 may identify a segment to emit light in response to the received event. When it is assumed that the identified segment is the fourth segment 507, the processor 150 may control the fourth segment 507 to emit light in response to the event. When the fourth segment 507 of the sub display area 133 emits light, the light emitted from the fourth segment 507 is reflected in the surface 201 as indicated by reference numeral 507a and the user may intuitively recognize the reception of the event even when the electronic device is positioned upside down.

According to an embodiment of the present disclosure, when the event is received, the processor 150 may detect a color of the surface 201 by using the photo sensor in a state when the electronic device is positioned upside down. After detecting the color of the surface 201, the processor 150 may control the remaining segments except for the segment corresponding to the received event in the sub display area 133 to emit light with the color of the surface 201. For example, as illustrated in FIG. 5C, when the event is received, the processor 150 may detect a color (for example, slashes from a lower left part to an upper right part) of the surface 201. The processor 150 may control the remaining segments (that is, the first segment 501, the second segment 503, the third segment 505, the fourth segment 507, and the sixth segment 511) except for the fifth segment 509 corresponding to the received event among the plurality of segments in the sub display area 133 to emit light with the detected color of the surface 201 (for example, the slashes from the lower left part to the upper right part). At this time, the fifth segment 509 corresponding to the received event may not emit light. For example, when the color of the surface 201 is black, the processor 150 may set the remaining segments except for the segment corresponding to the event in the sub display area 133 to emit light with the black color. At this time, the segment corresponding to the event in the sub display area 133 may not emit light. Alternatively, when the color of the surface 201 is white, the processor 150 may set the remaining segments except for the segment corresponding to the event in the sub display area 133 to emit light with the white color. At this time, the segment corresponding to the event in the sub display area 133 may not emit light.

When the fifth segment 509 of the sub display area 133 does not emit light, an area generated by reflecting the light emitted from the remaining segments (that is, the first segment 501, the second segment 503, the third segment 505, the fourth segment 507, and the sixth segment 511) except for the fifth segment 509 in the surface 201, is distinguished from an area in which the light is not reflected since the fifth segment 509 does not emit light as indicated by reference numeral 509a, so that the user may intuitively recognize the reception of the event even when the electronic device is positioned upside down.

Figure 6:
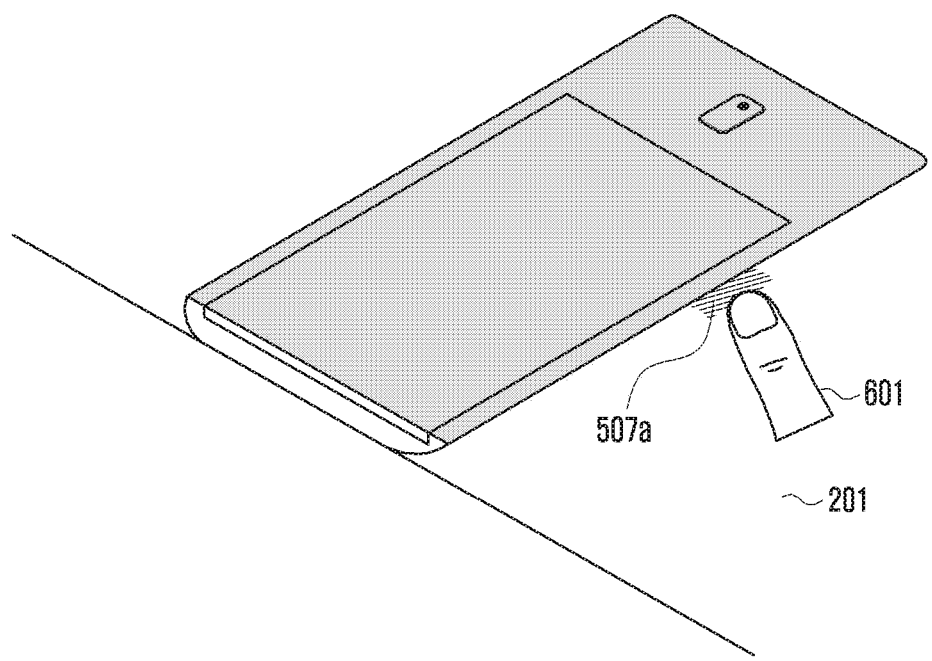
FIG. 6 illustrates a method of providing a notification according to an embodiment of the present disclosure.

FIG. 6 illustrates a method of providing a notification according to an embodiment of the present disclosure.

Referring to FIG. 6, when an event is received and the fourth segment 507 of the sub display area 133 corresponding to the received event emits light, the light emitted from the fourth segment 507 may be reflected and displayed in the surface 201 as indicated by reference numeral 507a. At this time, when proximity of a user's finger is detected in the reflected area 507a of the surface 201 by a photo sensor separately located in the sub display area 133 as indicated by reference numeral 601, the processor 150 may provide a response feedback of the received event. As described above, when the call event is received, the processor 150 may transmit a response feedback of a message or a voice such as "I cannot receive a call now" to an originator of the call event. Alternatively, the processor 150 may transmit a response feedback of a personalized message set to the originator of the call event. Alternatively, when the application update event is received and a user input of the received application update event is detected, the processor 150 may perform an application update function.

Figure 7A:
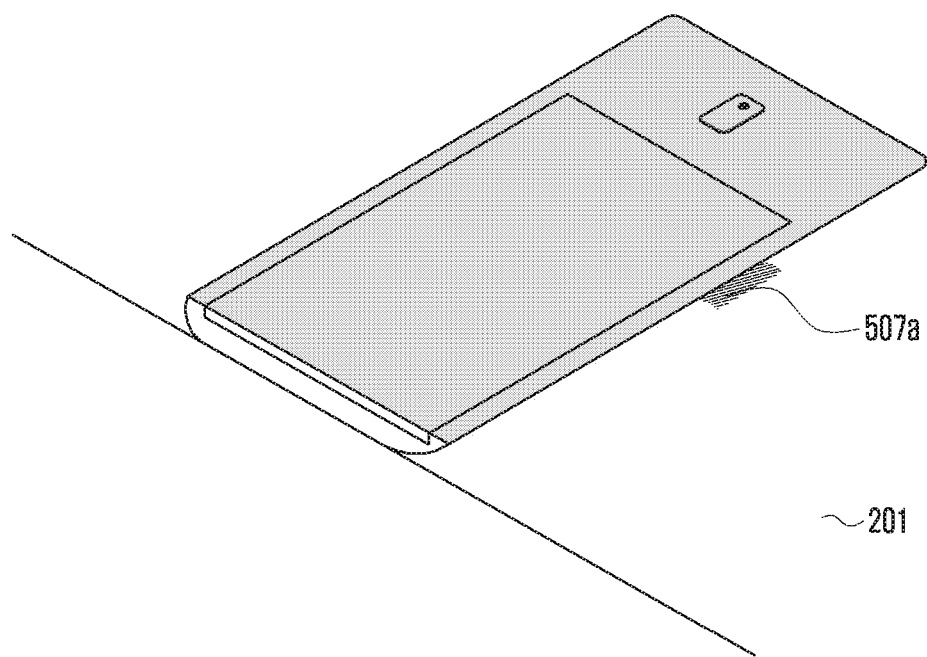
FIGS. 7A and 7B illustrate a method of providing a notification according to various embodiments of the present disclosure.
Figure 7B:
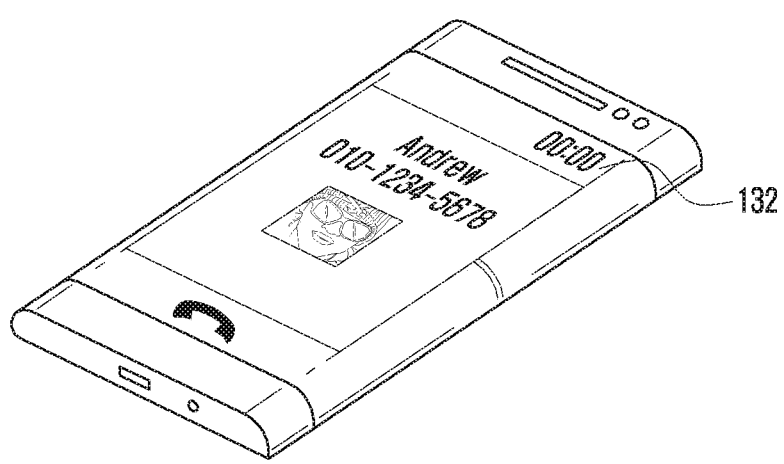

FIGS. 7A and 7B illustrate a method of providing a notification according to various embodiments of the present disclosure.

FIGS. 7A and 7B described below are diagrams illustrating, when an event is received, the electronic device outputs a notification in the sub display area in response to the received event in a state where the electronic device is positioned upside down, and the electronic device switches to a state where the electronic device is not positioned upside down, a method of switching the area in which the notification is output from the sub display area 133 to the main display area 132 and providing the notification in the main display area 132.

Referring to FIGS. 7A and 7B, when the event is received, the processor 150 may identify a state of the electronic device. As illustrated in FIG. 7A, when it is determined, as the state of the electronic device that the electronic device is positioned upside down through the sensor 140, the processor 150 may determine a notification type of the event as a first notification type. At this time, the processor 150 may emit light a segment corresponding to the received event in the sub display area 133 in response to the received event. For example, when a call event is received, the processor 150 may control the fourth segment 507 in the sub display area 133 to emit light as illustrated in FIG. 7A.

The processor 150 may detect switching of the electronic device while the fourth segment 507 corresponding to the received call event in the sub display area 133 emits light as illustrated in FIG. 7B. When the state switching of the electronic device is detected, the processor 150 may determine the notification type of the event as a second notification type. In other words, the processor 150 may determine, as the state of the electronic device, that the electronic device is not positioned upside down, switch the sub display area 133, which has emitted the light for the notification, to the main display area 132, and display the notification of the event. In other words, when the call event is received, the processor 150 may control the fourth segment 507 corresponding to the call event in the sub display area 133 to emit light as illustrated in FIG. 0.7A. When the state switching of the electronic device is detected, the processor 150 may display the notification of the call event in the main display area 132 as illustrated in FIG. 7B. That is, when the state switching of the electronic device is detected, the processor 150 may switch the area, in which the notification of the event is output, from the sub display area 133 to the main display area 132 or from the main display area 132 to the sub display area 133, and display the notification in the switched area.

Figure 8A:
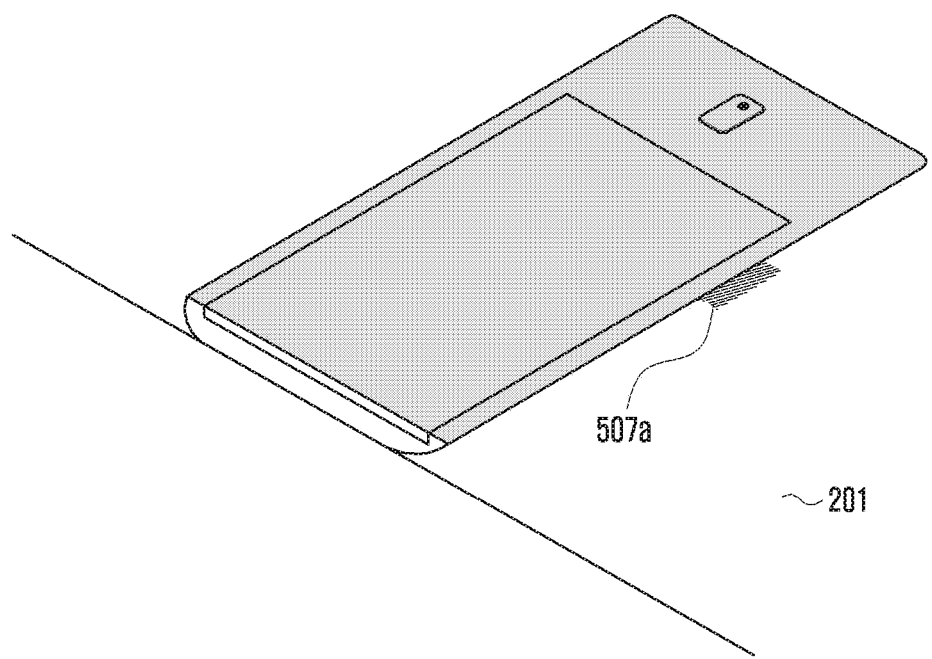
FIGS. 8A and 8B illustrate a method of providing a notification according to various embodiments of the present disclosure.
Figure 8B:
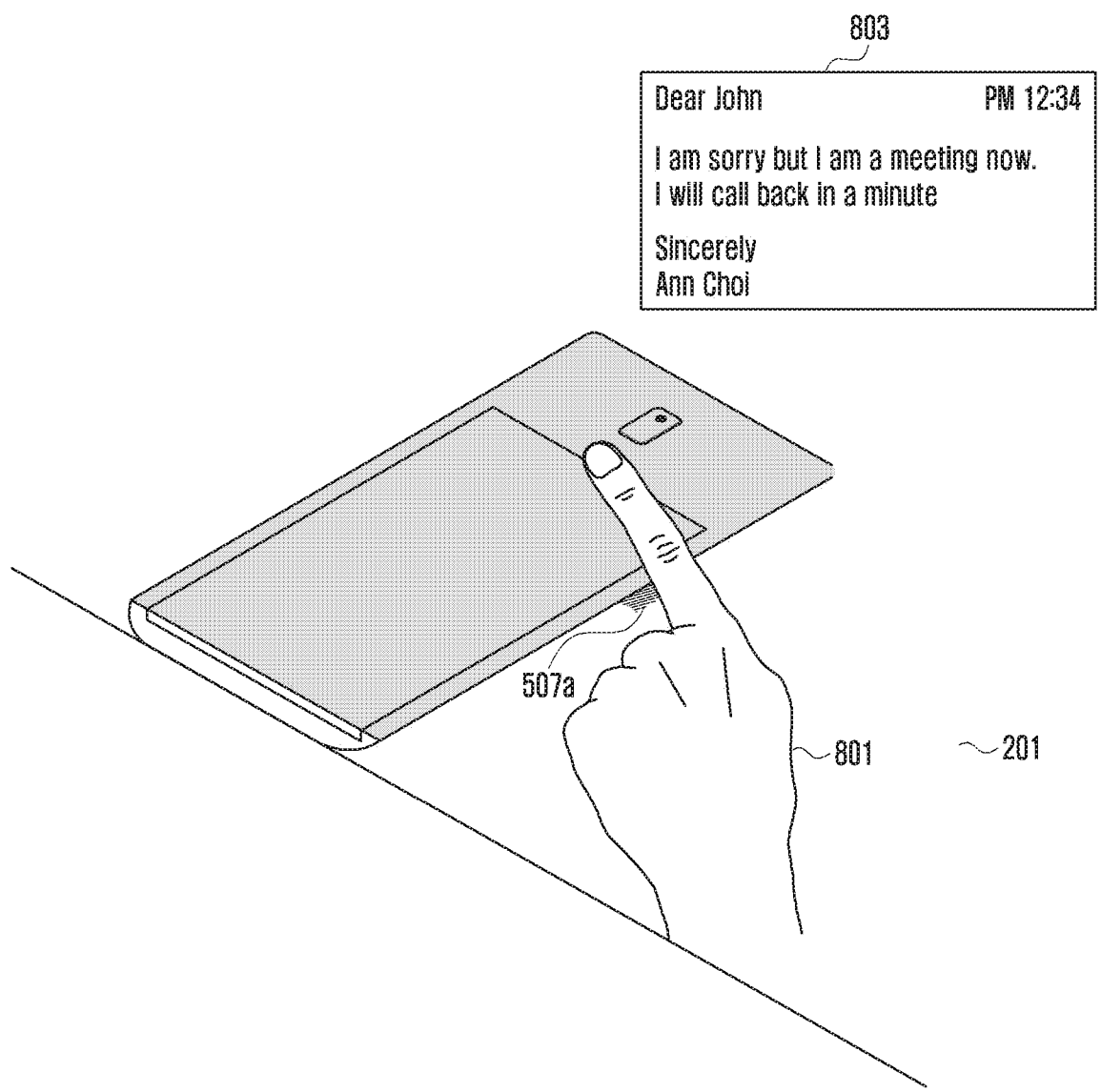

FIGS. 8A and 8B illustrate a method of providing a notification according to various embodiments of the present disclosure.

Referring to FIGS. 8A and 8B, when an event is received, the processor 150 may control a segment of the sub display area 133 set to an originator of the received event to emit light. For example, when the segment set to the originator is the fourth segment 507, the processor 150 may control the fourth segment 507 to emit light. At this time, the light emitted from the fourth segment 507 may be reflected and displayed in the surface 201 as indicated by reference numeral 507a of FIG. 8A. As illustrated in FIG. 8B, the processor 150 may determine whether a user finger 801 is in proximity to or contacts an HRM based on PPG measured through the HRM located on the rear surface of the electronic device while the light emitted from the fourth segment 507 is reflected and displayed in the surface 201 as indicated by reference numeral 507a. According to an embodiment of the present disclosure, the HRM may measure PPG according to an optical change based on vasorelaxation and vasoconstriction of the user's finger 801. When it is determined through the HRM that the user's finger 801 is in proximity to or contacts the HRM, the processor 150 may transmit a response feedback of the received event to the determined originator.

According to an embodiment, the present disclosure, it is assumed that the originator set to control the fourth segment 507 to emit light is "John." When a call event is received from "John," the processor 150 may control the fourth segment 507 in the sub display area 133 to emit light. At this time, the emitted light may be reflected and displayed in the surface 201 as indicated by reference numeral 507a. When it is detected that the user's finger contacts the HRM according to the PPG measured through the HRM, the processor 150 may transmit a personalized message 803 to "John" which is the originator as illustrated in FIG. 8B. For example, the processor 150 may extract information on the originator of the received call event. The processor 150 may extract a name that matches a calling number according to the call event by using contact information stored in the electronic device. The processor 150 may transmit a personalized message generated by inserting the extracted name to a message set by default.

Figure 9A:
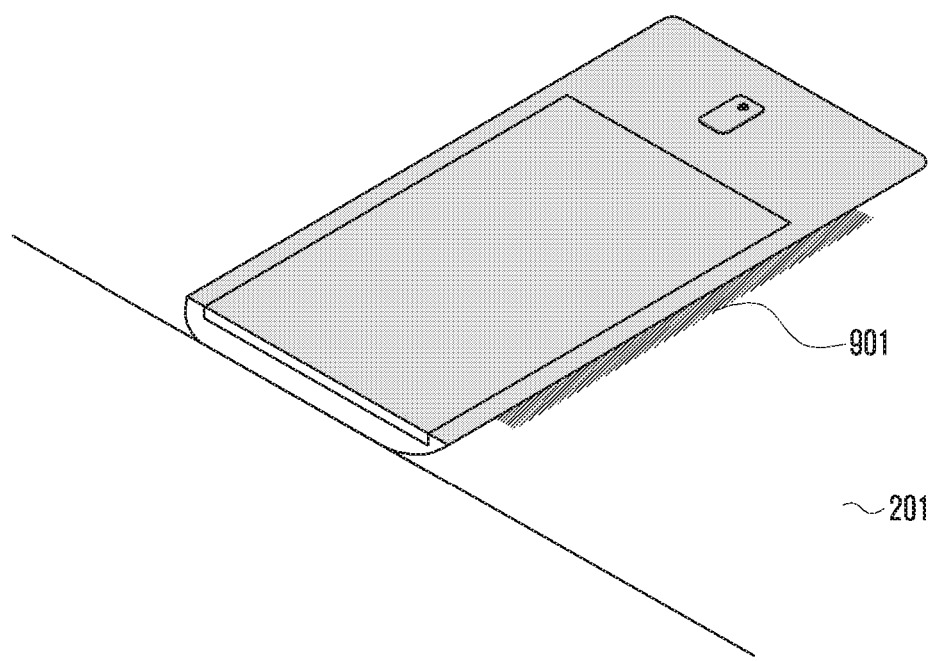
FIGS. 9A to 9C illustrate a method of providing a notification according to various embodiments of the present disclosure.
Figure 9B:
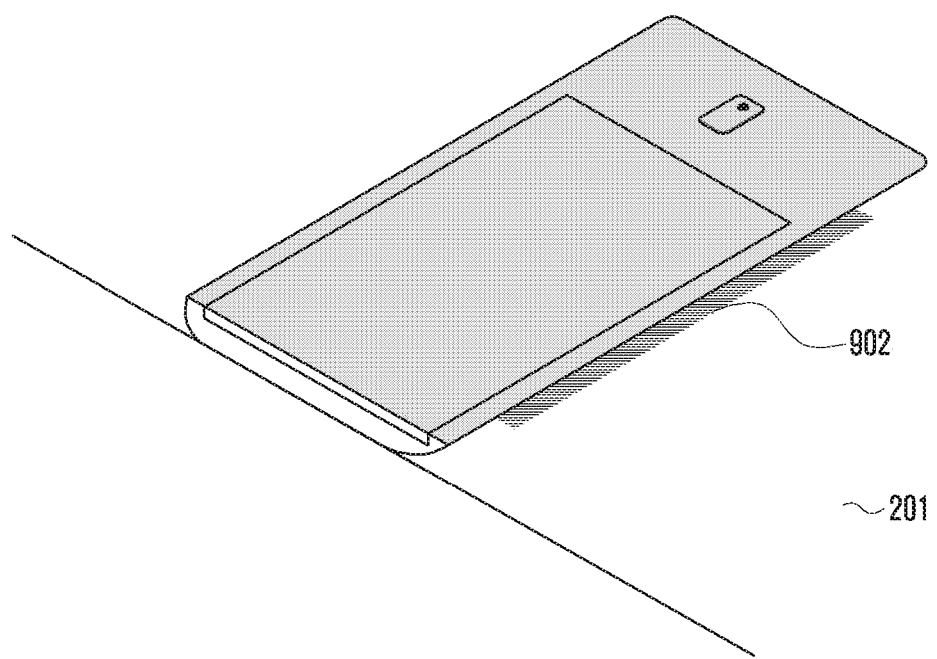
Figure 9C:
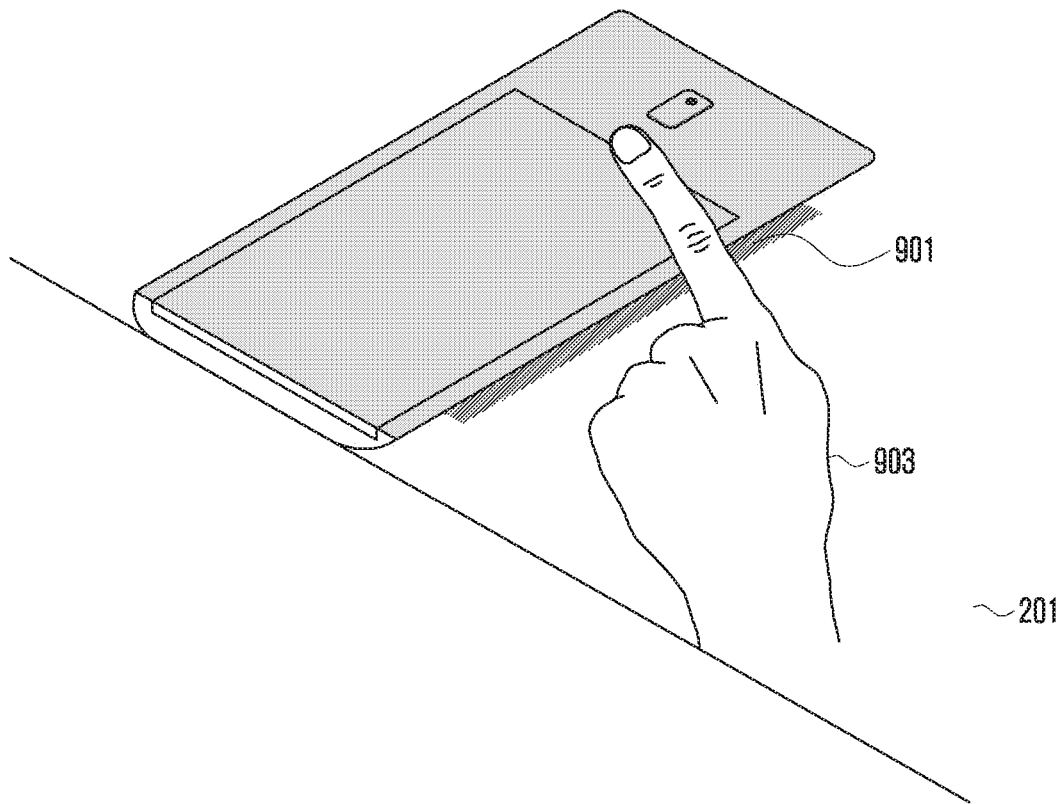

FIGS. 9A to 9C illustrate a method of providing a notification according to various embodiments of the present disclosure.

Referring to FIGS. 9A to 9C, when an event is received, the processor 150 may control the sub display area 133 to emit light with a color (or pattern) set to an originator of the received event. According to an embodiment of the present disclosure, when the light is emitted in a slash form from a lower left part to an upper right part as indicated by reference numeral 901 of FIG. 9A, it is assumed that the event is received from "John." When the light is emitted in a slash form from an upper left part to a lower right part as indicated by reference numeral 902 of FIG. 9B, it is assumed that the event is received from "Amy."

When the event is received from "John" as indicated by reference numeral 901 of FIG. 9C, the processor 150 may control the sub display area 133 to emit light in a slash form from a lower left part to an upper right part. The processor 150 may determine whether a user's finger 903 is in proximity to or contacts the HRM based on PPG measured through the HRM. When it is determined that the user's finger 903 contacts the HRM based on the PPG measured through the HRM, the processor 150 may transmit a response feedback of a personalized message set to "John" which is an originator as indicated by reference numeral 905. For example, the processor 150 may extract information on the originator of the received event. The processor 150 may extract originator information (for example, a name or a nickname) that matches a calling number according to the event by using contact information stored in the electronic device. Alternatively, when the event is a message, the processor 150 may parse the message to extract information on an originator (for example, a name and a phone number) of the message. The processor 150 may insert the extracted originator or originator information to the message set by default and transmit the message.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
   a first sensor;
   a second sensor;
   a transceiver;
   a display comprising a main display area corresponding to a front area of the electronic device and a sub display area that is continuing from the main display area; and
   at least one processor configured to:
      receive a communication event from an external device via the transceiver,
      detect a state of the electronic device using the first sensor,
      determine a notification type of a notification for the received communication event based on the state of the electronic device,
      output, when the notification type corresponds to a first type, the notification of the received communication event in the sub display area, and
      transmit, when a user input is detected via the second sensor located in the sub display area while the electronic device is in the detected state, a response feedback set to an originator of the received communication event to the originator via the transceiver,
   wherein the response feedback comprises a preconfigured message,
   wherein the sub display area is viewable when the electronic device is in the detected state and when the electronic device is not in the detected state, and
   wherein the detected state comprises the electronic device being positioned such that the main display area faces downward and contacts a surface, the main display area being obscured from view.

2. The electronic device of claim 1, wherein the at least one processor is further configured to:
   when a state switching of the electronic device is detected while the notification of the received communication event is output in the sub display area, determine the notification type as a second type, switch an area in which the notification is output from the sub display area to the main display area, and output the notification of the received communication event in the main display area.

3. The electronic device of claim 2, wherein the at least one processor is further configured to:
   determine the notification type as the first type when the electronic device is positioned such that the main display area faces downward and contacts the surface, and determine the notification type as the second type when the electronic device is positioned such that the main display area faces upward and does not contact the surface.

4. The electronic device of claim 3, wherein, when the notification type is the first type, in the sub display area divided into a plurality of segments, the processor is configured to control an individual segment or a plurality of segments including a combination of at least two segments, corresponding to the received communication event, to emit light.

5. The electronic device of claim 4, wherein, when the notification type is the first type, the at least one processor is further configured to control the sub display area to emit light by using at least one notification style of a light-emitting pattern, a light-emitting color, or a location of a segment to emit light according to the received communication event.

6. The electronic device of claim 5, wherein the at least one processor is further configured to control the sub display area to emit light based on a notification style according to a characteristic of the received communication event or priority information set for each communication event.

7. The electronic device of claim 1, wherein the at least one processor is further configured to detect the user input through the second sensor located in the sub display area or on a rear surface of the electronic device.

8. The electronic device of claim 7, wherein the second sensor located in the sub display area is a photo sensor or touch panel.

9. The electronic device of claim 7, wherein the second sensor located on the rear surface of the electronic device is a biometric sensor, and the at least one processor is further configured to detect the user input based on a photoplethysmography (PPG) signal measured through the biometric sensor.

10. The electronic device of claim 9, wherein, when the user input is detected through the biometric sensor, the at least one processor is further configured to transmit the response feedback set to the originator of the received communication event.

11. The electronic device of claim 9,
wherein the biometric sensor comprises a heart rate monitor (HRM), and
wherein the at least one processor is further configured to detect whether a user's finger is in proximity to or contacts the HRM according to an optical change based on vasorelaxation and vasoconstriction of the user's finger.

12. The electronic device of claim 1, wherein at least a portion of the sub display area is formed on a side surface of the electronic device.

13. A method of providing a notification, the method comprising:
receiving a communication event from an external device via a transceiver;
detecting a state of an electronic device using a first sensor, wherein the electronic device comprises a display including a main display area corresponding to a front area of the electronic device and a sub display area that is continuing from the main display area;
determining a notification type of a notification for the received communication event based on the state of the electronic device;
outputting, when the notification type corresponds to a first type, a notification of the received communication event in the sub display area; and
transmit, when a user input is detected via a second sensor located in the sub display area while the electronic device is in the detected state, a response feedback set to an originator of the received communication event to the originator via the transceiver,
wherein the response feedback comprises a preconfigured message,
wherein the sub display area is viewable when the electronic device is in the detected state and when the electronic device is not in the detected state, and
wherein the detected state comprises the electronic device being positioned such that the main display area faces downward and contacts a surface, the main display area being obscured from view.

14. The method of claim 13, further comprising:
when a state switching of the electronic device is detected while the notification of the received communication event is output in the sub display area, determining the notification type as a second type, switching an area in which the notification is output from the sub display area to the main display area, and outputting the notification of the received communication event in the main display area.

15. The method of claim 14, wherein the determining of the notification type of the received communication event comprises:
determining the notification type as the first type when the electronic device is positioned such that the main display area faces downward and contacts the surface; and
determining the notification type as the second type when the electronic device is positioned such that the main display area faces upward and does not contact the surface.

16. The method of claim 13,
wherein the sub display area is divided into a plurality of segments, and
wherein the outputting of the notification of the received communication event in the sub display area comprises controlling an individual segment or a plurality of segments including a combination of at least two segments of the plurality of segments, corresponding to the received communication event, to emit light.

17. The method of claim 16,
wherein the outputting of the notification of the received communication event in the sub display area comprises controlling the sub display area to emit light based on a notification style according to the received communication event, and
wherein the notification style is at least one of a light-emitting pattern, a light-emitting color, or a location of a segment to emit light.

18. The method of claim 17, further comprising:
when the notification type is the first type, identifying a characteristic of the received communication event or priority information on the received communication event,
wherein the outputting of the notification of the received communication event in the sub display area comprises controlling the sub display area to emit light based on a notification style according to the identified characteristic of the communication event or the identified priority information on the communication event.

19. The method of claim 13, wherein the user input is a gesture of detecting proximity of an object while the notification of the received communication event is output in the sub display area.

20. The method of claim 13,
wherein the second sensor located on a rear surface of the electronic device is a biometric sensor, and
wherein the user input is a gesture of detecting proximity or contact of an object based on a photoplethysmography (PPG) signal measured through the biometric sensor while the notification of the received communication event is output in the sub display area.

* * * * *